Figure 1:
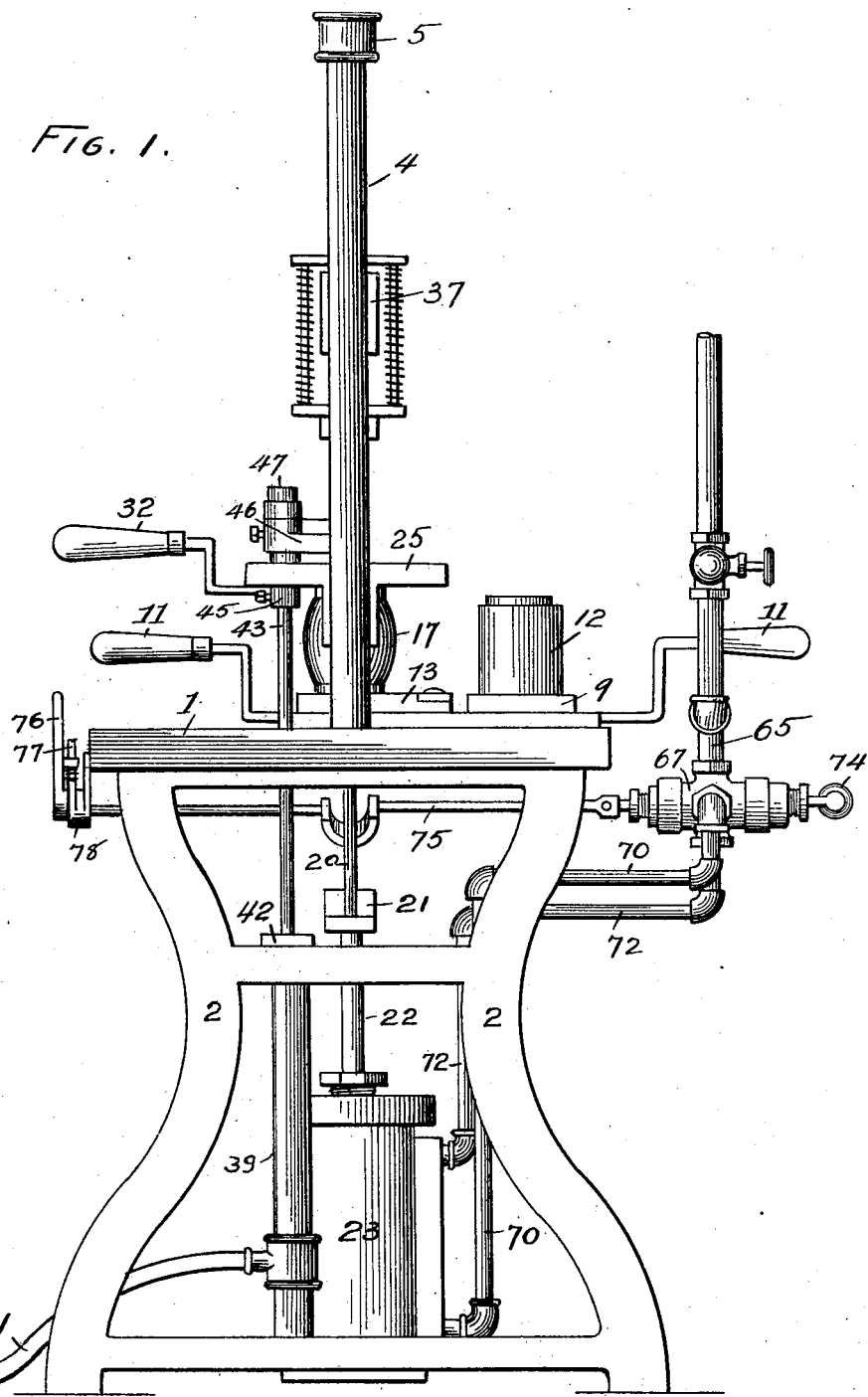

No. 703,599. Patented July 1, 1902.
C. J. KOENIG.
GLASS BLOWING MACHINE.
(Application filed May 17, 1901.)
(No Model.) 7 Sheets—Sheet 1.

Attest,
John Elble
William Sonntag

Inventor,
Christian J. Koenig.

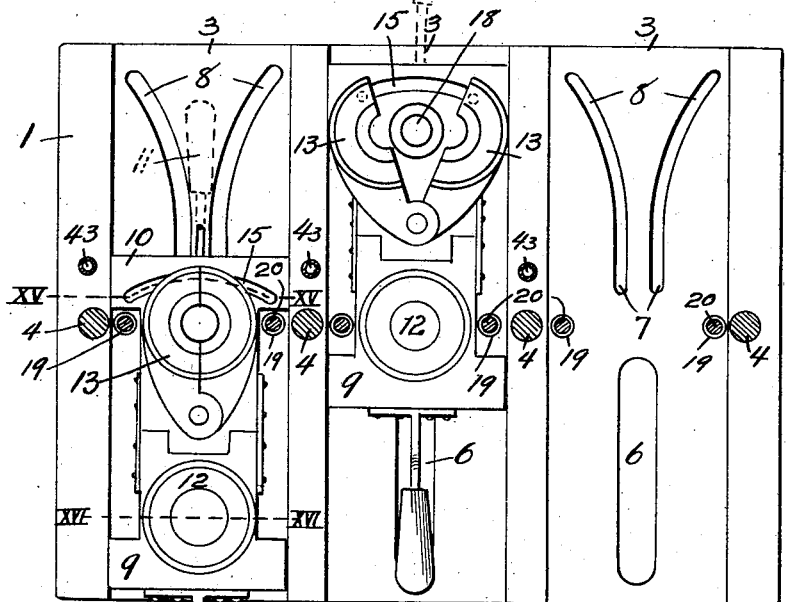
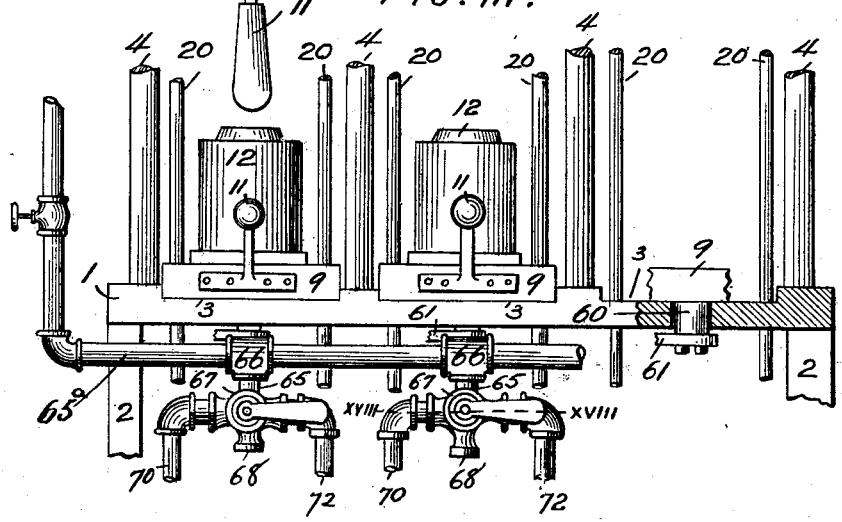

No. 703,599. Patented July 1, 1902.
C. J. KOENIG.
GLASS BLOWING MACHINE.
(Application filed May 17, 1901.)
(No Model.) 7 Sheets—Sheet 3.
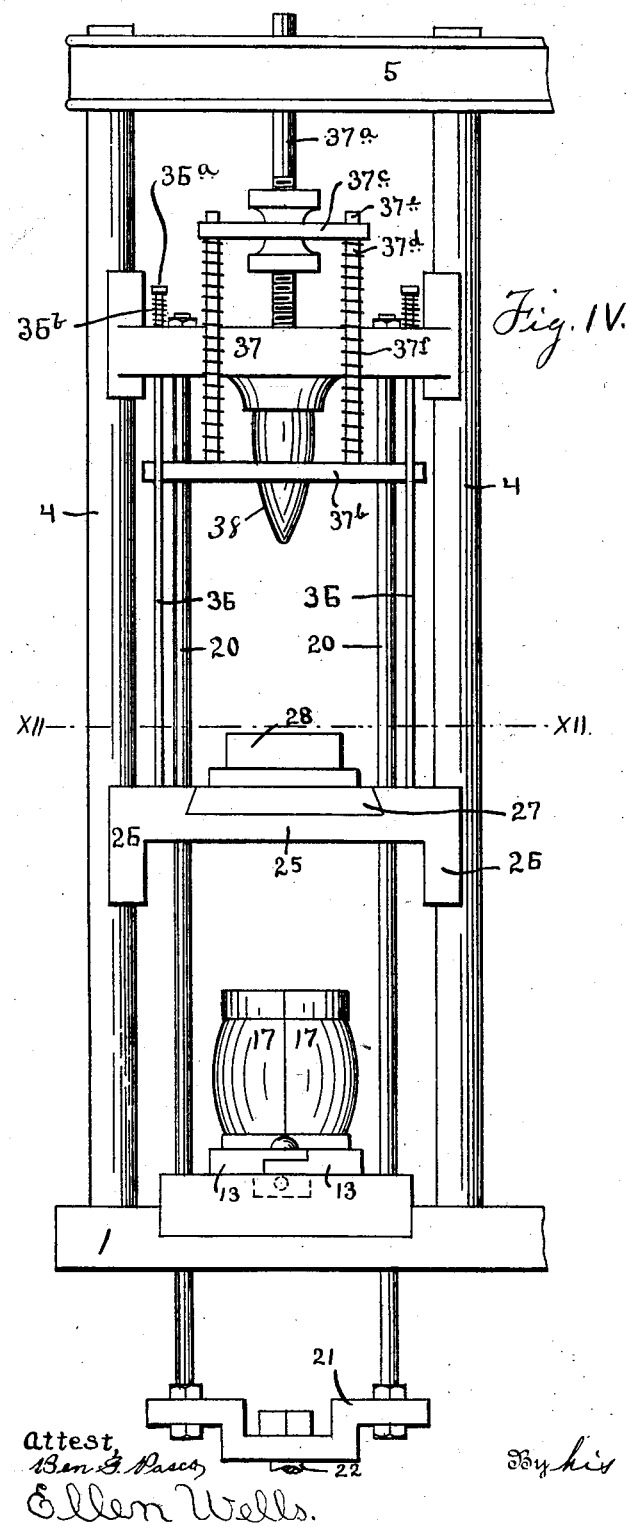
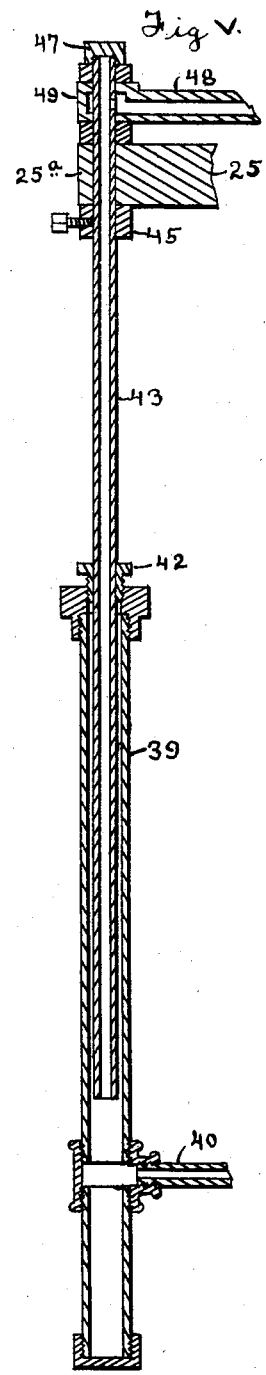

No. 703,599. Patented July 1, 1902.
C. J. KOENIG.
GLASS BLOWING MACHINE.
(Application filed May 17, 1901.)
(No Model.) 7 Sheets—Sheet 4.
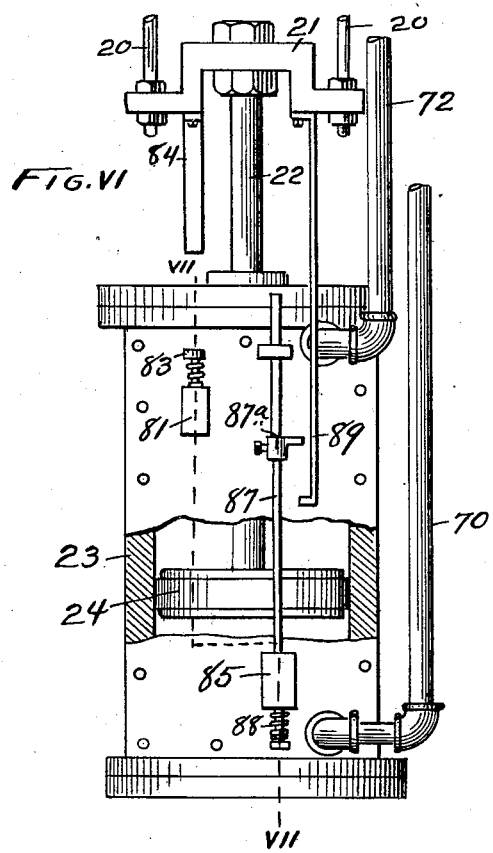
FIG. VI
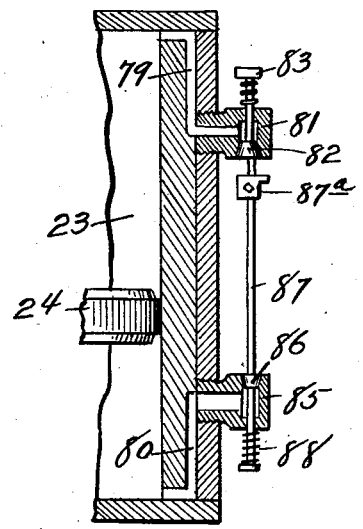
FIG. VII
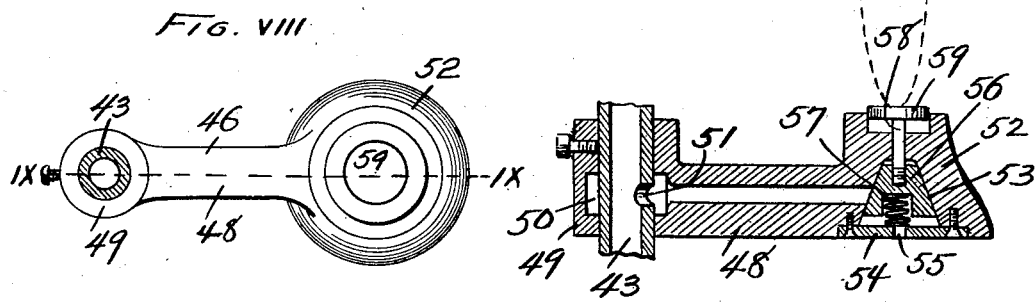
FIG. VIII  FIG. IX
Attest,
John Elble
William Sonntag
Inventor,
Christian J. Koenig
THE NORRIS PETERS CO., PHOTO-LITHO., WASHINGTON, D. C.

No. 703,599. Patented July 1, 1902.
C. J. KOENIG.
GLASS BLOWING MACHINE.
(Application filed May 17, 1901.)
(No Model.) 7 Sheets—Sheet 5.
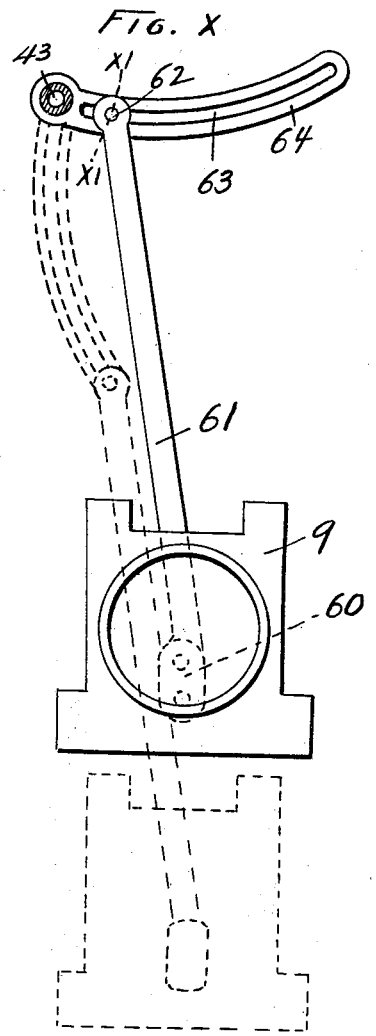
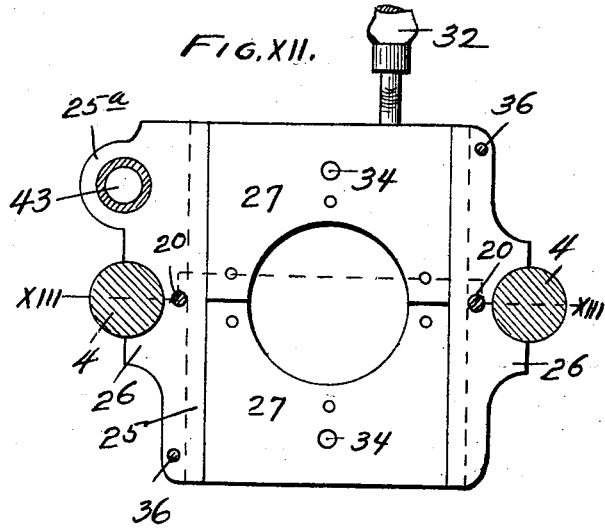
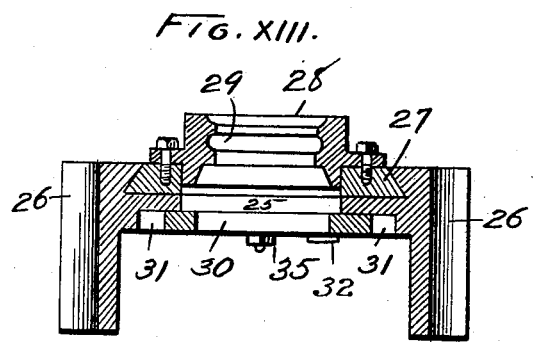
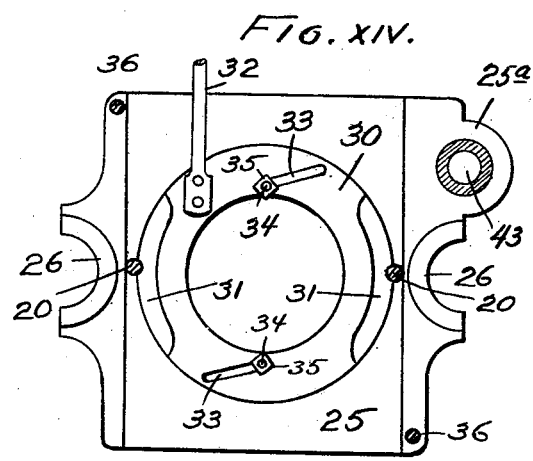
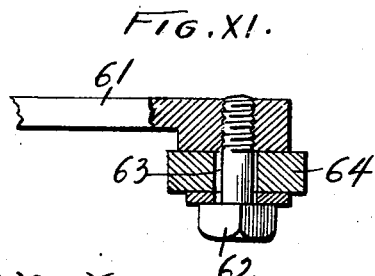
Attest:
John Elble
William Sonntag
Inventor
Christian J. Koenig No. 703,599. Patented July 1, 1902.
C. J. KOENIG.
GLASS BLOWING MACHINE.
(Application filed May 17, 1901.)
(No Model.) 7 Sheets—Sheet 6.
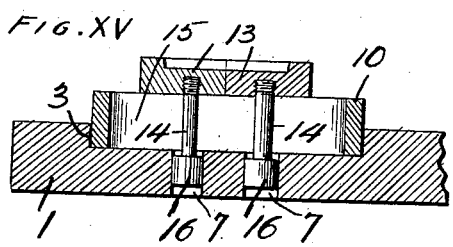
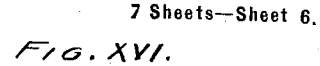
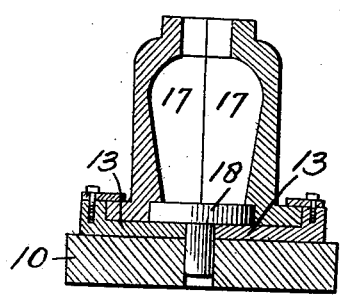
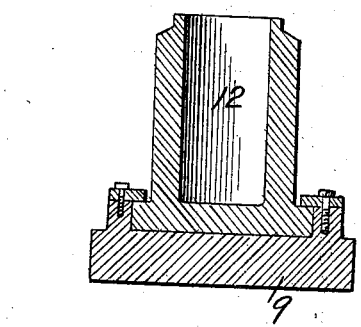
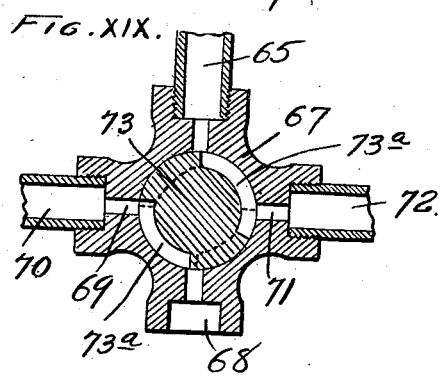
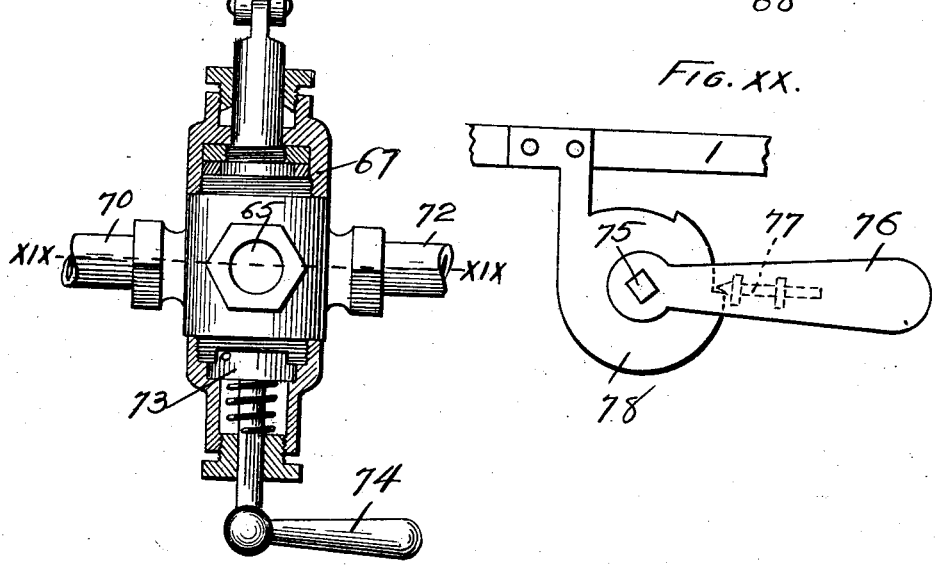
Attest.
John Elble
William Sonntag
Inventor,
Christian J. Koenig
THE NORRIS PETERS CO., PHOTO-LITHO., WASHINGTON, D. C.

No. 703,599. Patented July 1, 1902.
C. J. KOENIG.
GLASS BLOWING MACHINE.
(Application filed May 17, 1901.)
(No Model.) 7 Sheets—Sheet 7.
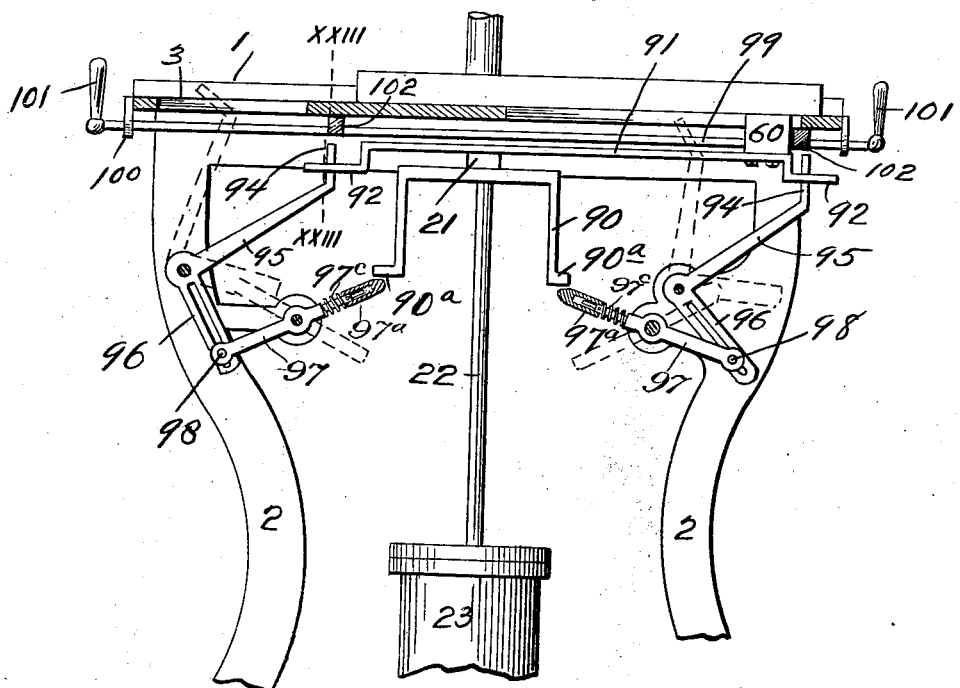
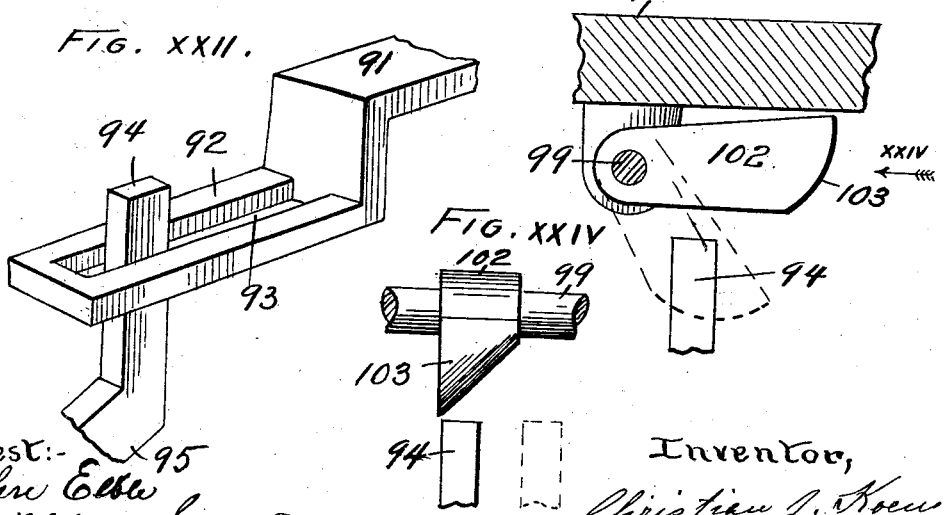

UNITED STATES PATENT OFFICE.

CHRISTIAN J. KOENIG, OF ALTON, ILLINOIS.

GLASS-BLOWING MACHINE.

SPECIFICATION forming part of Letters Patent No. 703,599, dated July 1, 1902.

Application filed May 17, 1901. Serial No. 60,787. (No model.)

*To all whom it may concern:*

Be it known that I, CHRISTIAN J. KOENIG, a citizen of the United States, residing in the city of Alton, county of Madison, State of Illinois, have invented certain new and useful Improvements in Glass-Blowing Machines, of which the following is a full, clear, and exact description.

My invention relates to machines for blowing glass bottles and the like; and my object is to construct a simple inexpensive machine wherein a number of movements and operations are automatic.

Figure I is a side elevation of my complete machine. Fig. II is a plan view of the bed-plate, certain parts of the device being removed in order to clearly illustrate the bed-plate. Fig. III is a front elevation of the bed-plate and parts contiguous thereto, a portion of said bed-plate being in section to more clearly illustrate the construction. Fig. IV is a front elevation of a portion of one end of the bed-plate, showing a pair of upright guide-posts and parts movable thereon, the press-mold being removed to show the blow-mold. Fig. V is a vertical sectional view of one of the telescoping compressed-air pipes which supplies a blow-valve. Fig. VI is a front elevation, partly in section, of one of a series of compression air-cylinders made use of in carrying out my invention. Fig. VII is a vertical sectional view taken approximately on the line VII VII of Fig. VI. Fig. VIII is a plan view of the blow-valve. Fig. IX is a longitudinal sectional view taken on the line IX IX of Fig. VIII. Fig. X is a detail plan view showing the connection between the blow-valve and the press-mold base. Fig. XI is an enlarged cross-section on line XI XI of Fig. X. Fig. XII is a horizontal sectional view taken approximately on line XII XII of Fig. IV, the neck-mold being removed. Fig. XIII is a cross-sectional view taken approximately on line XIII XIII of Fig. XII. Fig. XIV is a view of the under side of the device illustrated in Figs. XII and XIII. Fig. XV is an enlarged cross-sectional view taken approximately on line XV XV of Fig. II. Fig. XVI is an enlarged cross-sectional view taken approximately on line XVI XVI of Fig. II and showing the press-mold of the machine. Fig. XVII is a vertical sectional view of the blow-mold made use of in my invention. Fig. XVIII is an enlarged horizontal sectional view taken on line XVIII XVIII of Fig. III and illustrating one of the operating-valves controlling the compressed-air connection to the piston. Fig. XIX is a cross-sectional view taken approximately on line XIX XIX of Fig. XVIII. Fig. XX is a detail elevation of one of the handles made use of for operating the valve just mentioned. Fig. XXI is a vertical sectional view of the bed-plate and showing a modified construction for automatically moving the slides and molds upon said bed-plate. Fig. XXII is an enlarged detail perspective view illustrating a connection between a bell-crank and lever made use of in this modified construction. Fig. XXIII is an enlarged cross-sectional view taken approximately on line XXIII XXIII of Fig. XXI. Fig. XXIV is a front view of the mechanism seen looking in the direction indicated by the arrow XXIV in Fig. XXIII.

Referring to the drawings in detail, the rectangular bed-plate 1 is mounted upon a suitable frame or supporting-legs 2, and on top of the bed-plate is a plurality of parallel slideways 3. Fixed to and projecting upwardly from the bed-plate, on each side of and from between these slideways, are upright guide-rods 4, suitably framed together at their upper ends by a cross-bar 5. Formed through the bed-plate in the center and forward portion of each slideway is a longitudinally-extending slot 6, and formed through the bed-plate in the opposite or rear end of each slideway is a pair of mold-opening slots 7, which gradually diverge as they near the rear end of the bed-plate, as indicated by 8. Arranged to slide in each slideway 3 is a press-mold base 9 and a blow-mold base 10, suitably joined together, each base being provided with an operating-handle 11, and each press-mold base 9 carries a removable press-mold 12. (See Fig. XVI.) The blow-mold base 10 carries a pair of sectional blow-mold carriers 13, hinged together at their forward ends, and each of said carriers is provided on its rear end with a mold-opening trunnion 14, which passes through a transversely-arranged slot 15, formed in the base 10, the lower ends of these trunnions 14 being provided with antifriction-rollers 16, which operate in the mold-opening slots 7. (See Fig. XV.) By the construction just described the pair of mold-carriers 13 will automatically open and spread apart whenever the base 10 is moved to the rear end of the machine. The blow-mold (see Fig. XVII) is made in mating sections 17, each section being removably positioned upon a corresponding base 13. A blow-mold bottom 18 is removably positioned in each base 10 and forms the bottom of the blow-mold.

Formed at each side of the center of each slideway 3 are apertures 19, through which operate the connecting-rods 20, each pair of rods being joined together beneath the bed-plate by a cross-head 21. This cross-head 21 is carried upon the upper end of a piston-rod 22, that passes downwardly into a piston-cylinder 23, and being provided on its lower end with a piston 24, that operates in said cylinder. The upper ends of each pair of rods 20 operate through a neck-mold base 25, that is provided with ears 26, which operate against the upright guide-rods 4. The neck-mold bases 25 have integral ears 25$^a$, through which the telescoping compressed-air pipes pass. The sectional neck-mold carriers 27 are slidingly mounted on said bases 25 and the sectional neck-molds 28 are rigidly mounted on the carriers, and each section of the neck-mold is provided on its inner face with the annular grooves 29, in which are formed the neck of the bottle. A neck-mold-opening cam 30 is mounted for rotation in a recess 31, formed in the under side of each neck-mold base 25, and each cam is provided with an operating-handle 32, and the cam-pins 34 extend downwardly from neck-mold carriers through the tangential slots 33 in the cams 30 and are provided with nuts 35 on their lower ends. By this construction whenever the cam 30 is partially rotated the cam-pins 34, operating through the tangential slots, will cause the carriers 27, carrying the neck-molds, to move to or from one another, according to the direction in which the handle 32 is moved. The neck-mold-base rods 36 are rigidly fixed to the bases 25 and extend upwardly, sliding through the second cross-heads 37, which rigidly connect the upper ends of the connecting-rods 20, said cross-heads sliding between the guide-rods 4, and upon the upper ends of said rods 36 are seated nuts 36$^a$, and the expansive coil-springs 36$^b$ are placed upon said rods between the nuts 36$^a$ and the cross-heads 37 to form yielding supports for the neck-molds. The plunger guide-rods 37$^a$ are rigidly fixed to the second cross-heads 37 and slidingly mounted through the frame 5, which connects the upper ends of the guide-rods 4. The press-ring cross-heads 37$^c$ are adjustably mounted upon the rods 37$^a$. The press-rings 37$^b$ are slidingly mounted upon said connecting-rods 20. The press-ring rods 37$^d$ are fixed to the press-rings 37$^b$ and slide through the cross-heads 37$^c$. Heads 37$^e$ hold said rods in the cross-heads 37$^c$, and expansive coil-springs 37$^f$ allow the press-rings 37$^b$ to yield upwardly. The plungers 38 project downwardly from the centers of the second cross-heads 37 and loosely through the press-rings.

Located beneath the bed-plate and to the left of each slideway is a vertically-arranged tube 39, the lower ends of all of these tubes being connected by a cross-tube 40, and leading into one of said tubes is a flexible tube 41, suitable for conveying compressed air into said tubes. Formed in the upper end of each tube 39 is a suitable stuffing-box 42, through which slides or telescopes a small tube 43, that passes upwardly through the bed-plate to the left of each of the slideways 3, said tube 43 passing through the ear 25$^a$, formed on the neck-mold base 25, previously referred to. Each tube 43 is free to rotate in its respective base 25; but each tube and base move vertically together, for the reason that a collar 45 is located, by means of a set-screw, on each tube 43 just below each base 25. Held by means of a set-screw to the upper end of each tube 43 is a blow-valve 46, (see Figs. VIII and IX,) and above each blow-valve upon the upper end of each tube 43 is located a cap 47. Thus the tubes form the compressed-air pipes leading to the blow-valve. Each blow-valve comprises a hollow arm 48, which is formed integral with the head 49, that is located upon the tube 43, said head being provided with an annular chamber 50, that communicates with the passage in the arm 48, and also with an aperture 51, formed in the tube 43. The free end of the arm 48 is provided with an enlarged head 52, in which is formed a conical chamber 53, that communicates with the passage through the arm 48. This chamber 53 is closed at its under side by a plate 54, in the center of which is formed an aperture 55, and operating in the conical chamber 53 is a conical valve 56, normally held in a closed position by means of an expansive coil-spring 57. Seated in this valve and extending upwardly through the head 52 is a valve-stem 58, provided on its upper end with a disk 59. The conical valve 56 fits snugly in the conical chamber 53 and normally closes the passage through the tubular arm 48 in the chamber 53.

Each of the press-mold bases 9 is provided with an integral downwardly-projecting bed-plate arm 60, that passes through its corresponding slot 6, and to said arm underneath the bed-plate is bolted the end of a forwardly-projecting connecting-rod 61, the forward end of which carries a depending bolt or headed pin 62, that passes through the slot 63 of a curved and slotted blow-valve arm 64, which is rigidly fixed upon a corresponding tube 43. Thus when any of the bases 9 are slid backwardly or forwardly the tube 43, carrying the blow-valve 46, will be partially rotated, and said valve will be thrown into and out of position for blowing. (See Fig. X.)

Extending across the front of the bed-plate 1 is a tube 65ª, which leads from the source of the compressed-air supply, and located in said pipe 65ª, in front of each slideway 3, is a union 66, which has a tubular connection with the port 65 of the valve-casing 67. (See Figs. XVIII and XIX.) There are four ports oppositely arranged in the tubular valve-casing 67, and the port 68, directly opposite the inlet-port just mentioned, is the exhaust-port, and leading from one of the side ports 69 to the lower end of each cylinder is a tubular connection 70, and leading from the opposite side port 71 of each valve-casing to the upper end of each cylinder 23 is a tubular connection 72. A solid cylindrical valve 73 is mounted for rotation in each casing 67, which valve is suitably packed at each end of the casing, and formed in the periphery of said valve is a pair of oppositely-arranged recesses 73ª, of such length as that they will establish a communication between any adjacent two of the ports in the valve-casing. Located upon the stem at the front end of each valve is an operating-handle 74, and pivotally connected to the rear end of the stem of each valve is the front end of a rod 75, which extends beneath the bed-plate 1 to the rear side of the machine and there being provided with an operating-handle 76, which has a spring-actuated detent 77, that engages in suitable notches formed in the rack 78, fixed to the edge of the bed-plate 1.

The construction thus far described comprises the preferred form of my improved glass-blowing machine, and the operation thereof will now be described.

As the operations of all the sets of molds are alike, the operation of but one will be described. Assuming that the mold-bases 9 and 10 are drawn forwardly into the position shown at the left hand of Fig. II, with the valve 73 so turned as that the compressed air from the pipe 65 will enter the tubular connection at the top of the valve-casing and pass through one of the recesses 73ª, through the port 69 and pipe 70 into the cylinder 23, beneath the piston 24, the piston 24 being elevated by the compressed air in the lower part of the cylinder 23 will force the air out of the upper portion of said cylinder through the tube 72, through one of the recesses 73ª in the valve 73, and out through the exhaust-port 68. The operator now places a mass of melted glass in the press-mold 12, after which the operating-handle 11 is grasped and the bases 9 and 10 are moved rearwardly until said press-mold is brought to a position immediately beneath the plunger 38. The operator now manipulates the valve-handle 74 and turns the valve into the position as shown in Fig. XIX, thus reversing the direction of the flow of compressed air, as previously described, and said air will now pass from the tubular connection at the top of said valve-casing through the tube 72 to the upper end of the cylinder 24, and the compressed air beneath the piston in said cylinder will be forced out through the tube 70 and corresponding ports and finally through the exhaust-port 68. As this operation takes place the piston 24 and piston-rod 22 are caused to move downwardly, and as a result the connecting-rods 20 are drawn downwardly, and as this movement continues the neck-mold base 25 rests on top of the press-mold 12. When in this position, the neck-mold sections 28 are directly over the upper end of the press-mold, and the continued downward movement of the rods 20 causes the plunger 38 to pass downwardly through the neck-mold into the press-mold, and as a result thereof the melted glass is shaped within the blank-mold and forced into the annular grooves 29 in the neck-mold. The operator now reverses the position of the valve 73 to cause a reversal of the direction of flow of compressed air, and the piston 24, piston-rod 22, and rods 20 and parts carried thereby will be elevated, and in so doing the bottle-blank will be elevated with the neck-mold base 25, for the reason that a portion of the glass of said bottle-blank was forced into the annular grooves 29 of the neck-mold. When in this elevated position, the operator manually engages the handle 11 and brings the bases 9 and 10 to their original position, as shown in Fig. II and with the blow-mold immediately beneath the bottle-blank, which is now suspended from the neck-mold and base 25. As the base 9 is thus drawn to its original position the connecting-rod 61 will swing the slotted curved blow-valve arm 64 into the position as shown by dotted lines in Fig. X, and by so doing the tube 43 is partially rocked and the blow-valve 46 is swung around on top of the neck-mold and directly in the path of travel of the plunger 38. The operator now reverses the valve 73, so as to cause the piston 24 and parts carried thereby to descend, and as a result the base 25 is carried downwardly and the bottle-blank will enter the blow-mold 17. The further downward movement of the rods 20 and cross-head 37 will cause the lower end of the plunger 38 to strike against the disk 59, that is carried by the valve 56, and as a result said valve 56 will be unseated and the compressed air from the tube 43 will pass through the blow-valve out from the aperture 55 and blow the bottle to its proper form in the blow-mold. After this blowing operation is completed the operator, by means of the handle 32, rotates the cam 30 a short distance and by so doing moves the neck-mold carriers 34, carrying the sections of the neck-mold, apart, thus releasing the upper end or neck of the bottle, after which the valve 73 is reversed to allow the piston and vertically-moving parts to ascend to their normal positions. The operator now manually engages the handle 11 and moves the bases 9 and 10 through the slideway, so as to bring the press-mold into a central position, and by so doing the blow-mold carriers 13, carrying the sections 17 of the blow-mold, will swing apart, as shown in the central slideway 3 in Fig. II, owing to the operation of the antifriction-rollers 16 in the diverging ends 8 of the mold-opening slots 7, and after the carriers 13 are thus automatically opened the finished bottle is removed from the bottom 18.

In Figs. VI and VII, I have shown a construction which is designed to allow the air to exhaust from the cylinder 24 when the piston and various vertically-moving parts have reached a predetermined distance. This construction is adapted to be used whenever a large number of uniform-sized bottles are to be blown and it is desired that the vertically-moving plunger 38 stop at a certain elevation. In this construction ports 79 and 80 are formed in the upper and lower ends, respectively, of the cylinder 23, the upper port 79 leading to a valve-casing 81, which is provided with a downwardly-opening valve 82, provided with an upwardly-projecting spring-actuated valve-stem 83. A suitable bracket 84 is removably positioned upon the cross-head 21 and is intended to strike against the valve-stem 83 during the downward travel of said cross-head, thus opening the valve on the downward travel of the various parts. This will allow the air above the piston to exhaust out through the port 79. Consequently the vertically-moving parts will stop and reverse each time at a predetermined point on the downstroke corresponding to the length of the bracket 84. To stop and reverse the various vertically-moving parts on their upstroke, a valve-casing 85 is seated in the cylinder 23, to which valve-casing the port 80 leads, and closing the port in the casing 85 is a valve 86, provided with a stem 87, and an expansive coil-spring 88 normally holds said valve upon its seat in the casing. A finger 87$^a$ is adjustably located upon the upper portion of the valve-stem 87, which finger is intended to be engaged by the laterally-bent end of a rod 89, that depends from the cross-head 21 during the vertical movement of said cross-head. As said cross-head and various vertically-moving parts ascend the laterally-bent end of the rod 89 will engage the finger 87$^a$, and the valve 86 will be thereby unseated, and the air beneath the piston 24 will exhaust out through the port 80 and valve-casing 85, and as a result thereof the various vertically-moving parts will stop and reverse at a predetermined point on the upstroke corresponding to the length of the rod 89 or the position of the finger 87$^a$ upon the valve-stem 87.

The construction just described is particularly adapted for rapid work on large orders of uniform-sized bottles or jars, and by its use the piston and connected parts do not travel as great a distance as where the valves 81 and 85 are not used. As soon as the piston and connected parts reach the point when either one of the valves exhausts the operator immediately manipulates the valve 73 by means of the handle 74, and thereby reverses the movement of the piston 27, the helper during the upstroke of the piston manipulating the handles 11 and 32, and in this manner much time is saved.

In Figs. XXI to XXIV, inclusive, I have shown a modified construction for automatically shifting the bases 9 and 10 through the slideway, this operation being brought about by the vertical movement of the piston-rod 22 and mechanism now to be described.

Secured in any suitable manner to the cross-head 21 or to the piston-rod 22 is a cross-head 90, which is provided with downwardly-pending ends that terminate in laterally-bent fingers 90$^a$. These cross-heads (there being one for each piston-rod) occupy positions parallel with the slideways 3 and at right angles to the cross-heads 21. Rigidly fixed to each depending lug 60 is a longitudinally-extending bar 91, the ends 92 of which occupy positions below the main portion of said bar, and said lower ends are provided with slots 93. Operating in these slots are the upwardly-bent ends 94 of bell-cranks 95, which are similarly fulcrumed to suitable points on the frame of the machine, the lower arms 96 of said bell-cranks being slotted. Suitably pivoted adjacent the slotted ends of these bell-cranks are levers 97, the outer ends of which are provided with pins 98, which pass through the slots in the lower ends 96 of the bell-crank 95. The inner ends of these levers 97 lie directly in the path of travel of the outer ends of the fingers 90$^a$. Upon the inner end of each lever 97 is arranged a sliding finger 97$^a$, the end of which is wedge shape or rounded, as indicated by 97$^b$, a stiff coil-spring 97$^c$ normally pressing this finger outwardly. Extending beneath the bed-plate beneath each slideway 3 is a rod 99, which is journaled in suitable bearings 100 and provided on each end with an operating-handle 101. Fixed upon this rod immediately above and adjacent the upturned ends 94 of the bell-cranks 95 are the fingers 102, which are provided with beveled or inclined outer ends 103. When this construction is made use of and the piston-rod 22 descends from its elevated position, the fingers 90$^a$ engage against the inner ends of the fingers 97$^a$ of levers 97, bear downwardly upon the same, and said levers are swung into the position shown by dotted lines in Fig. XXI, and this movement causes the bell-cranks 95 to swing upon their fulcrums, and as a result thereof the bar 95 and bases 9 and 10 are moved along the slideway, this movement taking place previous to the time the plunger 38 enters the press-mold 12. When the piston-rod 22 is again elevated, the fingers 90$^a$ of the cross-head 90 engage beneath the inner ends of the fingers 97$^a$ of levers 97, and the bell-cranks, bar 91, and bases 9 and 10 are moved to their original positions.

When the levers 97 have swung to their limit of movement in either direction and the fingers 90ª pass beyond the ends of said levers, the ends of said fingers 90ª will engage against the rounded or wedge-shaped ends 97ᵇ of the fingers 97ª, overcome the resistance of the coil-springs 97ᶜ, and force the fingers 97ª rearwardly. Thus the fingers 90ª pass the ends of the levers 97, and the fingers 97ª are forced outwardly by the coil-springs 97ᶜ to be engaged by the next vertical movement of the fingers 90ª.

When the blowing operation takes place, it is necessary to lock the automatic mechanism just described in order that the bases 9 and 10 be not moved while the piston-rod 22 is descending to bring the die 38 onto the blow-valve, and just previous to this operation the operator rocks the shaft 99 by means of one of the handles 101, so that the outer ends of the fingers 102 are brought downwardly onto the upturned ends 94 of the bell-cranks 95, and as a result thereof said bell-cranks are slightly rocked upon their fulcrum-points in such a manner as to throw the free ends of the levers 97 slightly upward and out of the path of travel of the fingers 91. (See Figs. XXIII and XXIV.)

A machine of my improved construction is simple, inexpensive, readily performs the operations required to form and blow a bottle or glass jar, and as many of the movements are automatic much time and labor are saved in the blowing operations.

I claim as my invention—

1. In a machine of the class described, a bed-plate; mold-bases arranged to slide upon said bed-plate; a press-mold, carried by one of said bases; mating sections forming a blow-mold, carried by the opposite base; means whereby said mating sections are automatically swung apart when the mold-bases are moved backwardly upon the bed-plate; blow-valves operating above the blow-molds, cylinders, pistons and piston-rods beneath the bed-plate; means carried by the piston-rods of the cylinders for operating the blow-valves; tubular connections to the cylinders for conveying compressed air to the ends thereof; and controlling-valves located in said tubular connections; substantially as specified.

2. In a machine of the class described, a bed-plate; blow-molds upon said bed-plate; blow-valves operating above said blow-molds; cylinders beneath the bed-plate; pistons operating in said cylinders; means carried by said pistons for actuating the blow-valves; tubular connections for conveying compressed air to the tops and bottoms of the cylinders; operating-valves located in said tubular connections for controlling the flow of the compressed air above and below the pistons in the cylinders; and operating-handles for said valves; substantially as specified.

3. In a machine of the class described, a bed-plate; blow-molds upon said bed-plate; blow-valves operating above said blow-molds; cylinders beneath the bed-plate pistons operating in said cylinders; means carried by said pistons for actuating the blow-valves; tubular connections for conveying compressed air to the top and bottom of the cylinders; operating-valves located in said tubular connections for controlling the flow of the compressed air above and below the pistons in the cylinders; operating-handles for said valves; exhaust-valves located at different heights in the cylinders; and means carried by the piston-rods for actuating these exhaust-valves; substantially as specified.

4. In a machine of the class described, a bed-plate; in which is formed a plurality of slideways; mold-bases arranged to slide in said slideways; a press-mold carried by one of said bases; mating sections forming a blow-mold; carried by the opposite base; means whereby said mating sections are automatically swung apart when moved with the bases backwardly through the slideway; a blow-valve operating above the blow-mold; mechanism for actuating the blow-valve, and means operated by said last-mentioned mechanism for automatically moving the mold-bases through the slideway whenever said mechanism is operated, substantially as specified.

5. In a machine of the class described, a bed-plate; blow-molds sliding thereon; tubes beneath the bed-plate to which compressed air is supplied; second tubes telescoping in the first-mentioned tubes; blow-valves carried by said second tubes, and operating above the blow-molds, cylinders beneath the bed-plate; pistons and piston-rods operating in said cylinders; means carried by the piston-rods for operating the blow-valves; tubular connections for conveying compressed air to the tops and bottoms of the cylinders, and operating-valves located in said tubular connections for controlling the flow of compressed air to the cylinders above and below the piston, substantially as specified.

6. In a machine of the class described a bed-plate having a slideway, mold-bases arranged to slide in said slideway, a press-mold carried by one of said bases, mating sections forming a blow-mold carried by the opposite base; means whereby said mating sections are automatically swung apart when moved backwardly with the bases through the slideway; a blow-valve operating above the blow-mold; bed-plate arms extending downwardly from the press-mold base through a slot in the front part of the bed-plate; a curved and slotted blow-valve arm connected to said blow-valve and a blow-valve connecting-rod connecting said bed-plate arm to said blow-valve arm so that the blow-valve is moved into and out of operative position by sliding the mold-bases back and forth.

7. In a machine of the class described a bed-plate, a press-mold and a blow-mold mounted to slide upon the bed-plate, a blow-valve mounted to swing above blow-mold; a bed-plate arm extending downwardly from the mold through a slot in the bed-plate; a curved and slotted blow-valve arm connected to the blow-valve and a blow-valve connecting-rod connecting the bed-plate arm to the blow-valve arm so that the blow-valve is moved into and out of operative position by sliding the mold back and forth.

CHRISTIAN J. KOENIG.

Witnesses:
 A. B. DAVIS,
 LOUIS P. STEVENSON.